(12) United States Patent
DiFrank

(10) Patent No.: US 6,212,910 B1
(45) Date of Patent: *Apr. 10, 2001

(54) FOREHEARTH FEEDER TUBE CLAMP DOWN SYSTEM

(75) Inventor: Frank J. DiFrank, Toledo, OH (US)

(73) Assignee: Owens-Brockway Glass Container Inc., Toledo, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/287,882

(22) Filed: Apr. 7, 1999

Related U.S. Application Data

(63) Continuation-in-part of application No. 09/130,313, filed on Aug. 7, 1998, now Pat. No. 6,151,918.

(51) Int. Cl.[7] .............................. A44B 21/00; C03B 5/18; C03B 5/26
(52) U.S. Cl. ......................... 65/172; 292/46; 292/256.69; 292/257
(58) Field of Search ................................ 292/46, 256.69, 292/257; 65/172, 325, 331, 355

(56) References Cited

U.S. PATENT DOCUMENTS

| | | | |
|---|---|---|---|
| 1,532,514 | * 4/1925 | Raynes | 65/172 |
| 1,760,254 | * 5/1930 | Peiler | 65/171 |
| 1,843,248 | * 2/1932 | Soubier | 65/129 |
| 1,852,218 | * 4/1932 | Peiler | 65/129 |
| 3,239,326 | * 3/1966 | Tyner | 65/330 |
| 4,478,631 | 10/1984 | Mumford . | |
| 4,514,209 | 4/1985 | Mumford . | |
| 4,551,163 | * 11/1985 | Duga et al. | 65/129 |
| 4,554,000 | 11/1985 | Suomala et al. . | |
| 5,693,114 | 12/1997 | Scott . | |

* cited by examiner

Primary Examiner—Sean Vincent

(57) ABSTRACT

A feeder tube assembly for a feeder bowl of a glass melting furnace forehearth. The feeder tube assembly has an horizontally extending elongate support arm, and a feeder tube that is carried by the support arm at a location near an end of the support arm. The feeder tube is held in place by a clamping ring that engages a flange of the feeder tube at an end of the feeder tube. The clamping ring is releasably held in engagement with the flange of the feeder tube by a plurality of latch mechanisms that are circumferentially spaced apart. Each latch mechanism has a lever with a rounded cam surface and a handle that extends away from the cam surface and is pivotally attached to a support member. The support member, in turn is pivotally attached to a fixed member, and pivoting of the pivoted support member relative to the fixed member is effective to swing the lever out of interfering relationship with the clamping ring to facilitate removal of the clamping ring.

5 Claims, 13 Drawing Sheets

FOREHEARTH FEEDER TUBE CLAMP DOWN SYSTEM

CROSS-REFERENCE TO RELATED APPLICATION

This application is a continuation-in-part of U.S. patent application Ser. No. 09/130,313, in which I am named as an inventor, which was filed on Aug. 7, 1998 now U.S. Pat. No. 6,151,918.

BACKGROUND OF THE INVENTION

1. Field of the Invention

This invention relates to a feeder tube assembly for a feeder bowl of a glass melting furnace forehearth. More particularly, this invention relates to a clamp down system for releasably clamping a feeder tube in its operating position.

2. Description of the Prior Art

U.S. Pat. No. 5,718,741 (Hull et al.), which is assigned to the assignee of this application, the disclosure of which is incorporated herein by reference, discloses a forehearth for cooling a stream of molten glass as it flows from a glass melting furnace to a forming machine for forming the molten glass into finished products, for example, hollow glass containers of the type widely used in packaging various food, beverage and other products. In the arrangement of the '741 Patent, and in a variety of other types of forehearths, molten glass flows downwardly through an opening, or a plurality of openings, in the bottom of a feeder bowl at an end of the forehearth that is remote from the end into which molten glass from the melting furnace flows.

To control the flow of molten glass from a forehearth feeder bowl, a vertically extending, refractory feeder tube is provided with its lowermost end immersed in the feeder bowl to a level slightly above the inside surface of the bottom of the feeder bowl and surrounding the opening(s) at the bottom of the feeder bowl, and the ceramic tube is caused to rotate slowly during the operation of the forehearth to ensure a proper mixing and temperature uniformity of the molten glass flowing from the feeder bowl. A feeder bowl refractory tube with a tube drive system of this general type is disclosed in U.S. Pat. No. 5,660,610 (DiFrank), which is also assigned to the assignee of this application, the disclosure of which is also incorporated by reference herein. Other glass forehearth feeder bowl feeder tube arrangements are described in U.S. Pat. No. 5,693,114 (Scott), U.S. Pat. No. 4,514,209 (Mumford), and U.S. Pat. No. 4,478,631 (Mumford), the disclosure of each of which is also incorporated by reference herein.

From time to time during the operation of a glass manufacturing system of a type employing a forehearth feeder bowl feeder tube of the type described above it is necessary to remove the feeder tube and/or the feeder bowl for repair or replacement. In the case of the replacement of the feeder bowl, the feeder tube must also be swung horizontally out of the way of the feeder bowl as well as being lifted vertically so that its lower edge clears the upper extent of the feeder bowl. It is also necessary from time to time to be able to adjust the height of the feeder tube. As a feeder tube of this type is quite massive, very large forces are required to lift it from its operating position. Heretofore, counterweighted lift mechanisms were employed for this purpose, and these mechanisms typically employed gear boxes with considerable backlash, thus making precise positioning and motions of the feeder tube very difficult. Moreover, in these arrangements, precise adjustment of the position of the feeder tube in a horizontal plane, in X and/or Y directions, was difficult to achieve in that the horizontal motions of the counterweight lift mechanisms could not be isolated along X or Y axes. Further, counterweighted lift mechanisms are cumbersome because of the dead weights employed in them, and the vertical feeder tube slide supports are subject to wear during up and down tube adjustments, which can impart a wobbling motion to the tube support system and thereby lead to undesired glass gob weight variation in a feeder bowl used in conjunction with a glass container forming machine of the individual section (I.S.) type. Also, from time to time, it is necessary to replace a feeder bowl itself. In the prior art, this required removal of the entire feeder tube mechanism itself. A feeder tube in apparatus of the type described is releasably held in place by a circumferentially spaced apart plurality of clamps. Heretofore, it has been difficult to release such clamps, which typically involved threaded members, because of the tendency of such members to corrode in the high temperature environment of a feeder tube installation and the need for workers to wear temperature resistant gloves during this procedure, gloves that are quite bulky

SUMMARY OF THE INVENTION

According to the present invention of the aforesaid co-pending U.S. patent application, the aforesaid and other problems associated with prior art glass forehearth feeder bowl feeder tube lift systems are avoided by a feeder tube lift system that employs a single, multiple shaft, servo motor operated, ball screw lift mechanism of sufficient capacity to sustain a cantilevered feeder tube support mechanism with minimal deflection. Such a lift mechanism involves no, or very little, backlash in its motions, thereby permitting precise control of the elevation of the lift tube in the feeder bowl, which is important in achieving accurate control of glass gob weight in an I.S. machine glass container manufacturing operation.

The feeder tube lift mechanism of the present invention is also capable of true isolated adjustments in a horizontal plane, both along X and Y axes, and it can be moved without slide wear, thereby avoiding introduction of wobbling motion to the tube support system. The servo motor powered ball screw lift mechanism of the present invention is lubricated by a lubricant that is recirculated within a closed system to ensure long life for bearings of the mechanism and the ball roller nut, and avoiding lubricant leakage and the need for lubricant replacement.

According to the invention of the aforesaid co-pending U.S. patent application, and according to an improved version of such invention according to this patent application, there is provided an improved clamp for releasably clamping a feeder tube engaging clamping ring in its clamping position against a flange of the feeder tube while the feeder tube is in its operating position with respect to the rotatable support. Each such clamp has a variable radius cam that is rotatable about a radially extending horizontal axis to make secure contact with the clamping ring regardless of the elevation of the feeder tube, but which is capable of being swung out of interfering contact with the feeder tube to permit the feeder tube to be removed for repair or replacement after first removing the clamping ring used to engage a flange of the feeder tube.

Accordingly, it is an object of the present invention to provide an improved clamp down system for clamping a feeder tube of the type employed in a glass forehearth feeder bowl. More particularly it is an object of the present invention to provide a clamp down-system that is rapidly releasable in that it does not require threaded fasteners in its design or installation.

For further understanding of the present invention and the objects thereof, attention is directed to the drawing and the following brief description thereof, to the detailed description of the preferred embodiment and to the appended claims.

DETAILED DESCRIPTION OF THE PREFERRED EMBODIMENT

Figure 3:
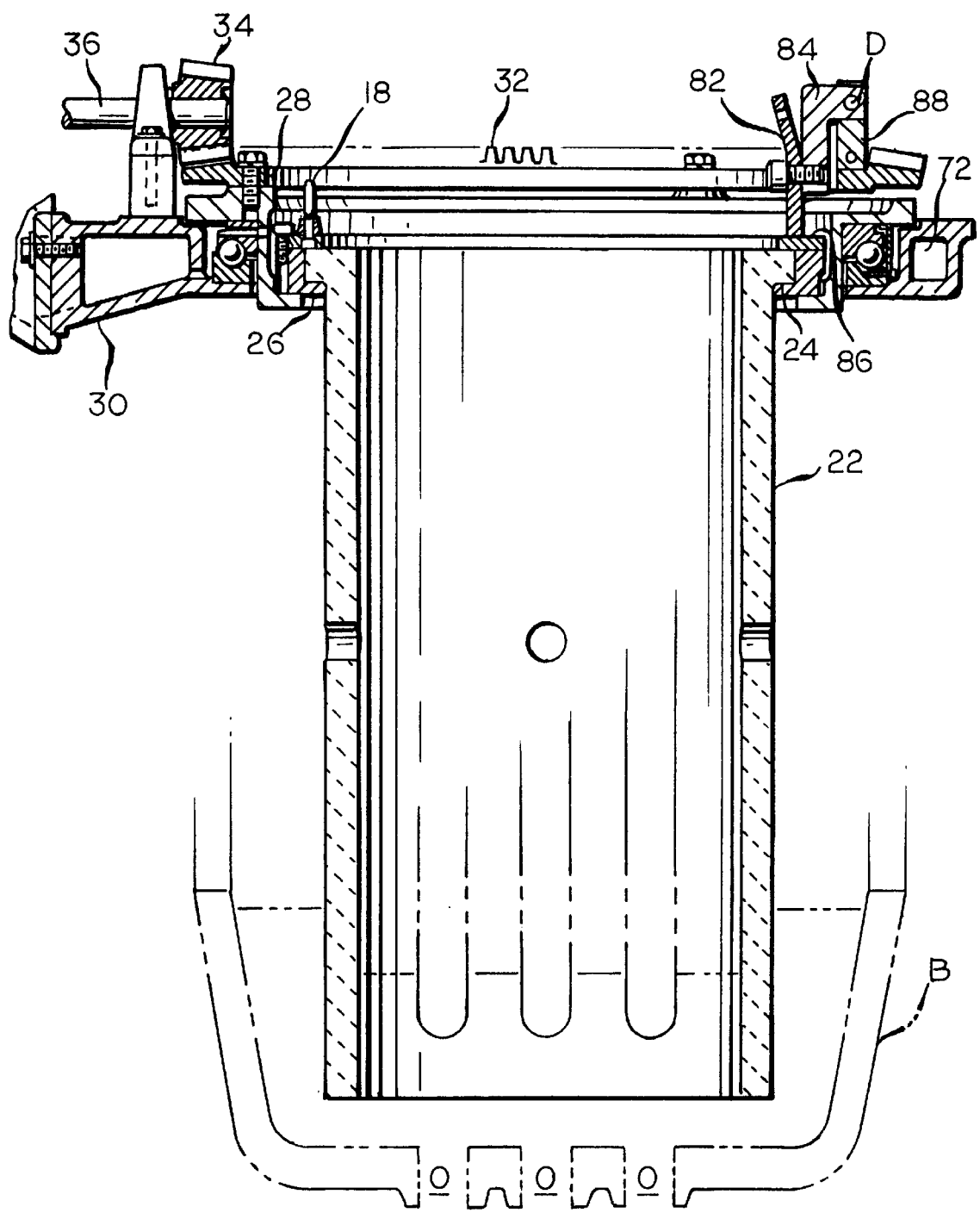
FIG. 3 is a sectional view taken on line 3—3 of FIG. 2.

A feeder tube assembly in which the preferred embodiment of the present invention is used is identified generally by reference numeral 20 in the drawing. The feeder tube assembly 20 includes a refractory feeder tube 22 which, as is shown in FIG. 3, is adapted to be inserted into a molten glass feeder bowl B at the outlet end of a generally horizontally extending molten glass cooling forehearth, otherwise not shown, which may be of conventional construction. The feeder tube 22 is vertically oriented in the feeder tube assembly 20, and its lowermost end is positioned slightly above the inside surface of the feeder bowl B, to thereby allow molten glass to flow through the space below the feeder tube 22 to exit through openings O at the bottom of the feeder bowl B.

Figure 2:
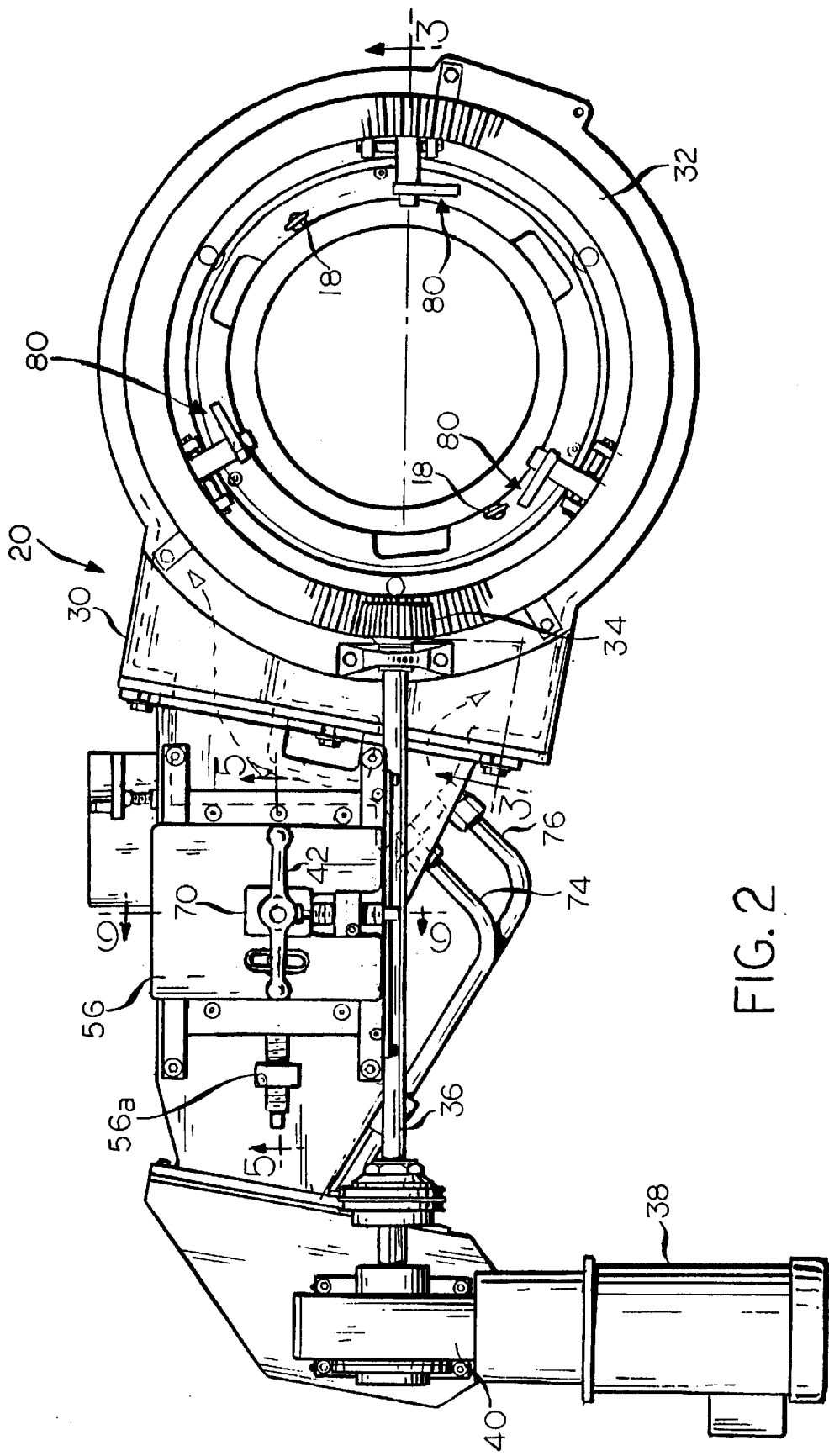
FIG. 2 is a plan view of the feeder tube assembly of FIG. 1.

The feeder tube 22 has an outwardly projecting flange 24 at its upper end, and the flange 24 is clamped in a clamping ring subassembly 86, FIG. 3, which is provided with lifting eyes 18, FIGS. 2, 3, and serves to support the feeder tube 22 on an inwardly a projecting flange 26 of a rotatable ring subassembly 28. The rotatable ring subassembly 28 is cantilevered at the end of a support arm 30, and the subassembly 28 includes an upwardly facing ring gear 32, FIG. 2, and is caused to rotate slowly with respect to the support arm 30 by the engagement of the ring gear 32 by a driven pinion 34 at an end of a driven rod 36, which is driven by a motor 38 acting through a speed reducer 40, all of which are supported on the support arm 30 at an end opposed to the end on which the feeder tube 22 is suspended. The rotation of the feeder tube 22 helps to properly mix the molten glass in the feeder bowl B to thereby ensure proper homogeneity and temperature uniformity of the molten glass exiting through the openings O, FIG. 3.

Figure 5:
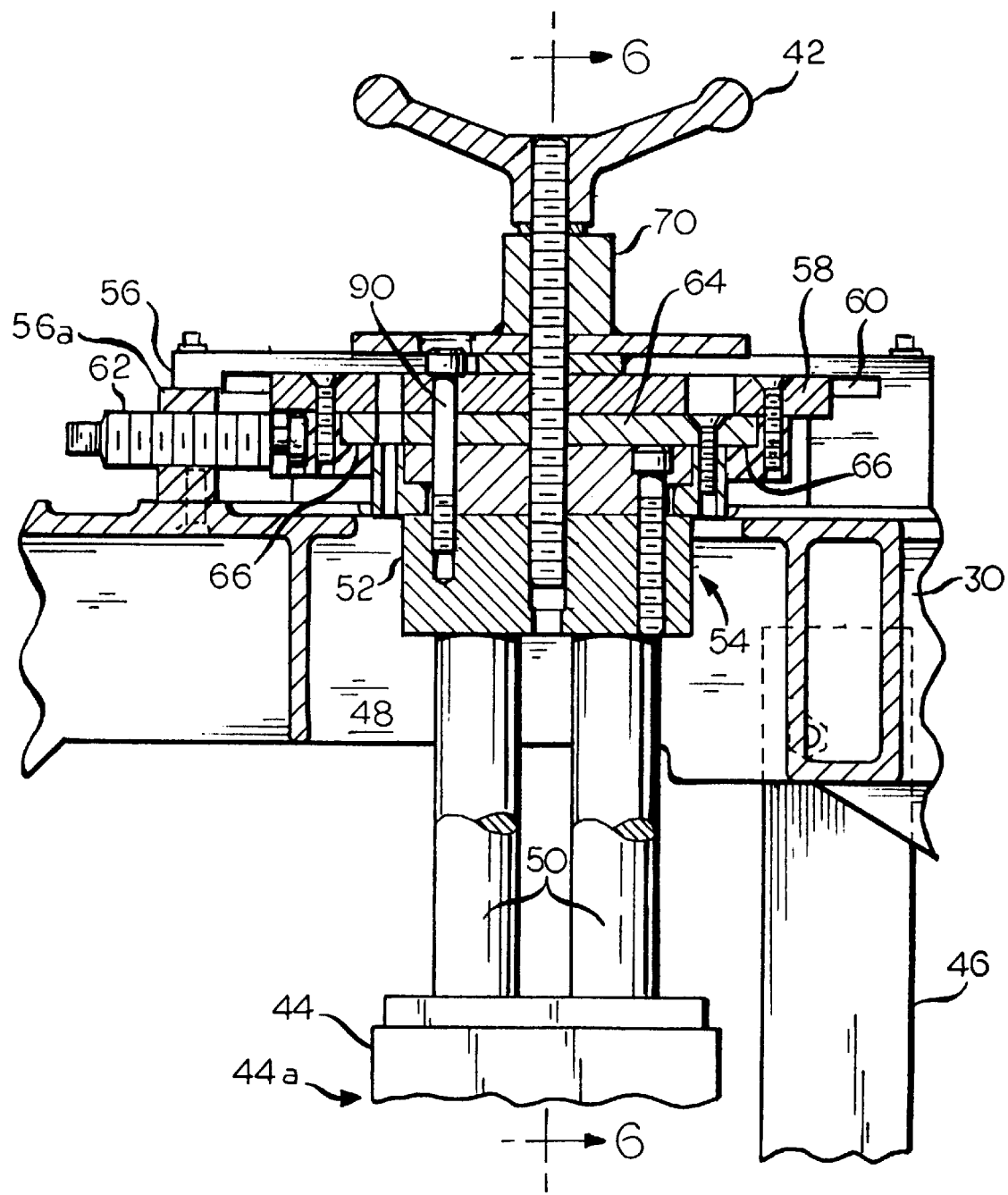
FIG. 5 is a fragmentary sectional view taken on line 5—5 of FIG. 2.

The support arm 30 is supported along a vertically extending axis A that extends through a handle 42, which serves to lock the support arm in a non-adjustable and a non-pivotable position as will be hereinafter described more fully. The support arm 30 is also adjustably supported for precisely controllable motion along the axis A on a vertically extending servo motor powered precision linear actuator 44, FIG. 1, a cylinder portion 44a, FIG. 5, of which is secured to the framework 46 of the feeder tube assembly 20. The linear actuator 44 is of a type that is available from E-Drive Design, Inc. of Glastonbury, Conn. under the product designation Model EA2S-7.312-L/D 1836, and will be subsequently described in greater detail. The support arm 30 has an opening 48, FIG. 5, extending therethrough concentric with the axis A and generally concentric with the longitudinal central axis of the linear actuator 44. A spaced apart plurality of rods 50 extend outwardly and upwardly from the linear actuator 44 and are caused to reciprocate in unison along vertical axes by the actuation of the linear actuator 44. The rods 50 are non-rotatably received in a block 52 of a composite adjustment mechanism 54, which is supported on an inverted cup-shaped structure 56 that is secured to the upper surface of the support arm 30, FIG. 5.

The adjustment mechanism 54 includes an upper plate 58, and the support arm 30 is moveable relative to the upper plate 58 along opposed spaced apart slot 60 in the structure 56, which extend generally parallel to the longitudinal axis of the support arm 30 to provide for precisely controllable adjustment of the support arm 30, and thereby of the feeder tube 22, in the X direction. To accomplish such adjustment, an adjusting screw 62, which is threadably received in the structure 56a, has an inner end that engages the upper plate 58, and the turning of the adjustment screw 62 is effective to move the support arm 30 to or fro in the X direction relative to the adjustment mechanism 54, whose position in an horizontal plane is fixed by virtue of the attachment of the linear actuator 44 to the framework 46, as described.

The adjustment mechanism 54 also includes a lower plate 64, and the support arm 30 is moveable relative to the lower plate 64 along opposed, spaced apart slots 66 in the cup-shaped structure 56, which extend transversely of the longitudinal axis of the support arm 30, to provide for precisely controllable adjustment of the support arm 30, and thereby of the feeder tube 22, in the Y direction. To accomplish such adjustment, an adjustment screw 68, which is threadably received in an extension of the upper plate 58, has an inner end that engages a boss portion 70 of the cup-shaped structure 56, and turning of the adjustment screw 68 moves the support arm to or fro in the Y direction relative to the adjustment mechanism 54. Of course, when the handle 42 is tightened down against the boss 70, the support arm 30 will be frictionally prevented from moving relative to the adjustment mechanism 54, either in the X direction or the Y direction.

Figure 1:
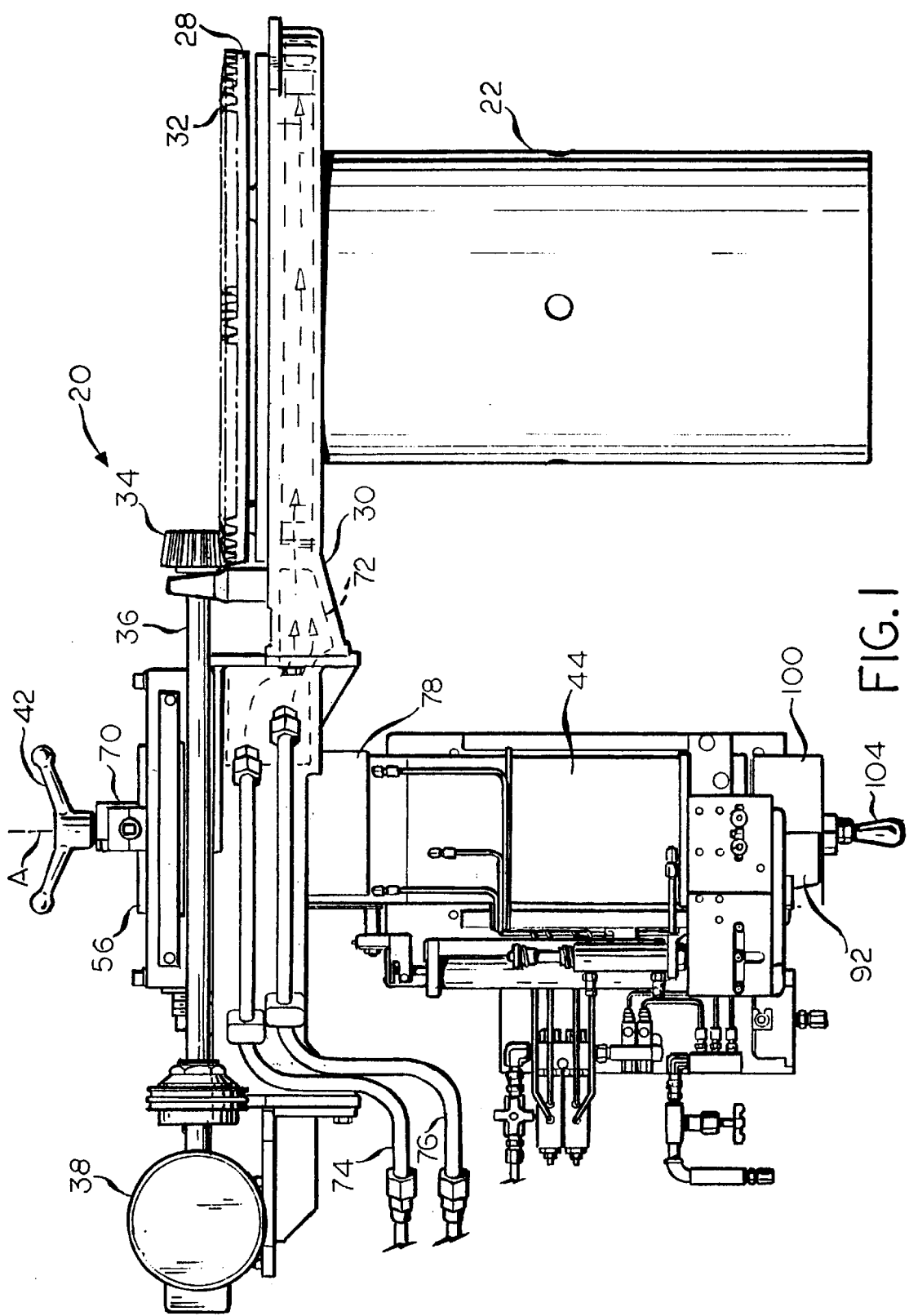
FIG. 1 is a fragmentary elevational view of a feeder tube assembly incorporating a clamp down system according to the preferred embodiment of the present invention.

Because of the high temperature environment in which the feeder tube 22 is used, it is important to cool the end of the support arm 30 from which the feeder tube 22 is suspended. To that end, an annular passage 72, FIGS. 1, 3, is provided in the support arm 30 surrounding and extending generally concentrically of the feeder tube 22, and cooling air or other cooling fluid is caused to flow through the passage 72 from inlet and outlet lines 74, 76, respectively. Further, a generally semi-cylindrical heat shield 78 is suspended form the support arm 30 at a location partly surrounding the upper end of the linear actuator 44, and between the linear actuator 44 and the feeder tube 22, to retard heating of the linear actuator 44 by heat radiated from the feeder bowl B.

The flange 24, FIG. 3, of the feeder tube 22 is securely, but releasably, held in engagement with the flange 26 by a plurality of circumferentially spaced apart latch mechanisms, each generally identified by reference numeral 80, FIG. 2, three such latch mechanisms being shown in FIG. 2. Each latch mechanism 80 comprises a lever 82, FIG. 3, with a handle portion 82a at an end thereof and an enlarged cam portion 82b at an opposed end, FIG. 7 the lever 82 is pivotably connected to a support member 84 about an axis C and, when the lever extends vertically, the cam portion 82b securely engages an upper surface of the clamping ring 86 which engages the flange 24 of the feeder tube 22 to forcibly press the flange 24 into its desired operating position. When the lever 82 is pivoted to a horizontal orientation, the cam portion 82b no longer engages the ring 86, FIG. 7. In this position, the feeder tube 22 may be removed from the feeder bowl B by a simple lifting motion, using the lifting eyes 18, FIGS. 2 and 14. The latch mechanisms 80 are moveable out of alignment with the feeder tube 22 by pivotably connecting the support member 84 to a fixed structure 88 about an axis D. In that regard, the support member 84 is slidable toward an enlarged area 88a of the fixed structure 88, where it can then be pivoted about the axis D out of interfering relationship with the clamping 86. Before installing a new feeder tube 22, the support arm 30 should be elevated so that the new feeder tube 22 does not contact the feeder bowl B.

The pivoting of the support arm 30 about the axis A is done when it is desired to replace a feeder bowl B. After releasing the feeder tube 22 from its engaged position by the release of the latch mechanisms 80, as heretofore described, and after the actuation of the linear actuator 44 to lift the support arm 30 to an elevation such that the bottom of the feeder tube 22 is free of the feeder bowl B, the feeder tube 22 is then hoisted from the subassembly 28. To this end, the upper plate 58 of the adjustment mechanism 54 is pivotable with respect to the lower plate 64, after removal of an alignment pin 114 that circumferencially aligns the upper plate 58, the lower plate 64 and the block 52 with respect to one another during the operation of the feeder tube assembly 20.

Figure 8:
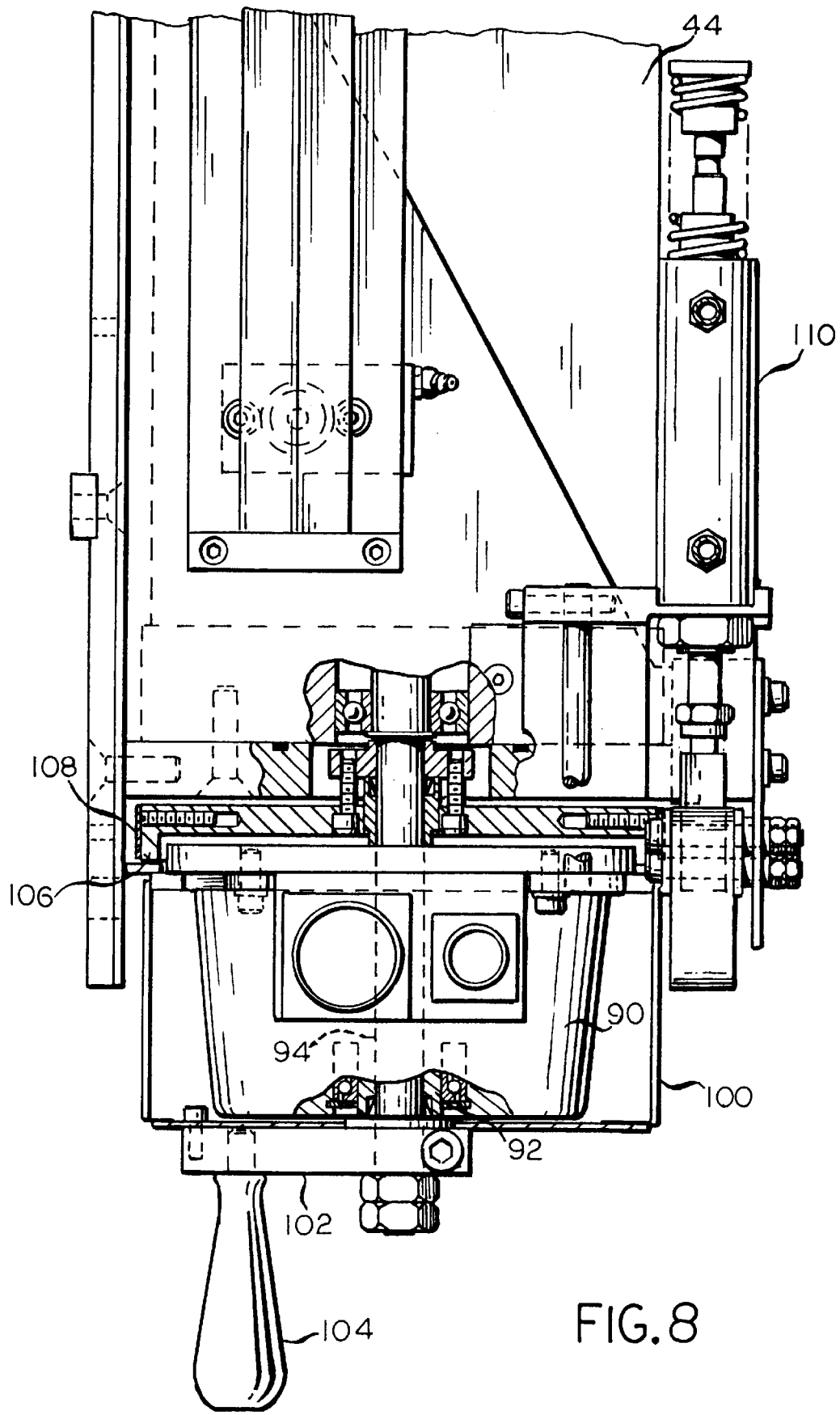
FIG. 8 is a fragmentary elevational view, partly in cross section, of a portion of the feeder tube assembly of FIGS. 1–6.
Figure 9:
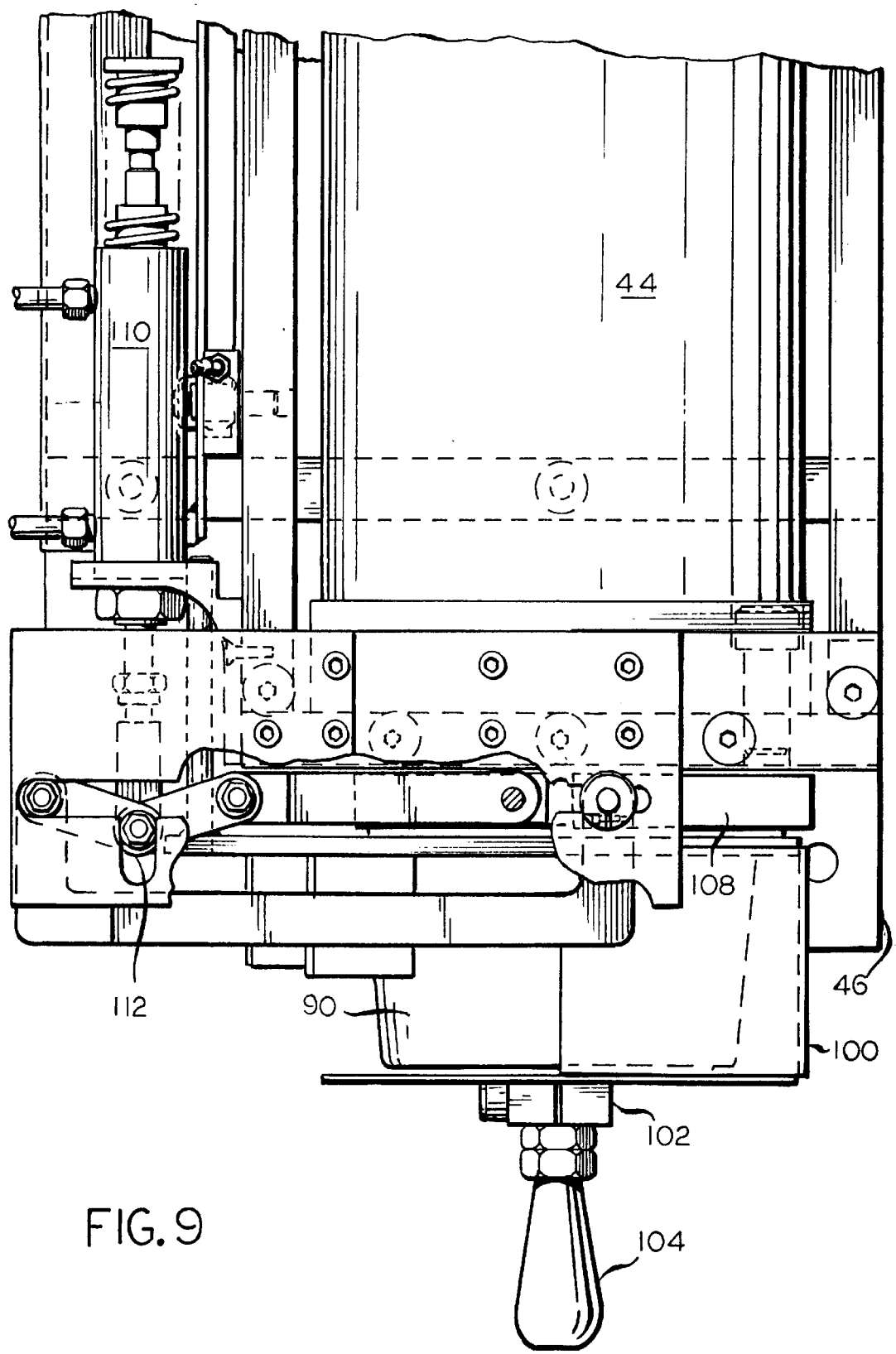
FIG. 9 is a view similar to FIG. 8 at a right angle thereto.
Figure 10:
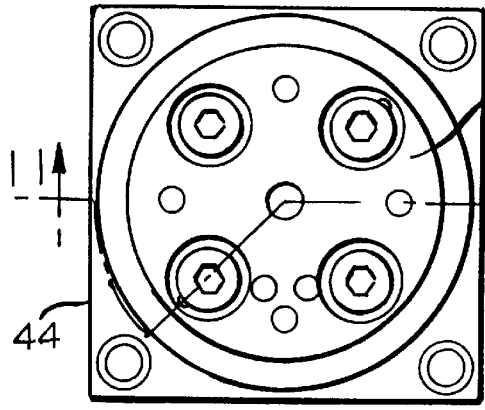
FIG. 10 is a plan view of an element of the feeder tube assembly of FIGS. 1–6.
Figure 11:
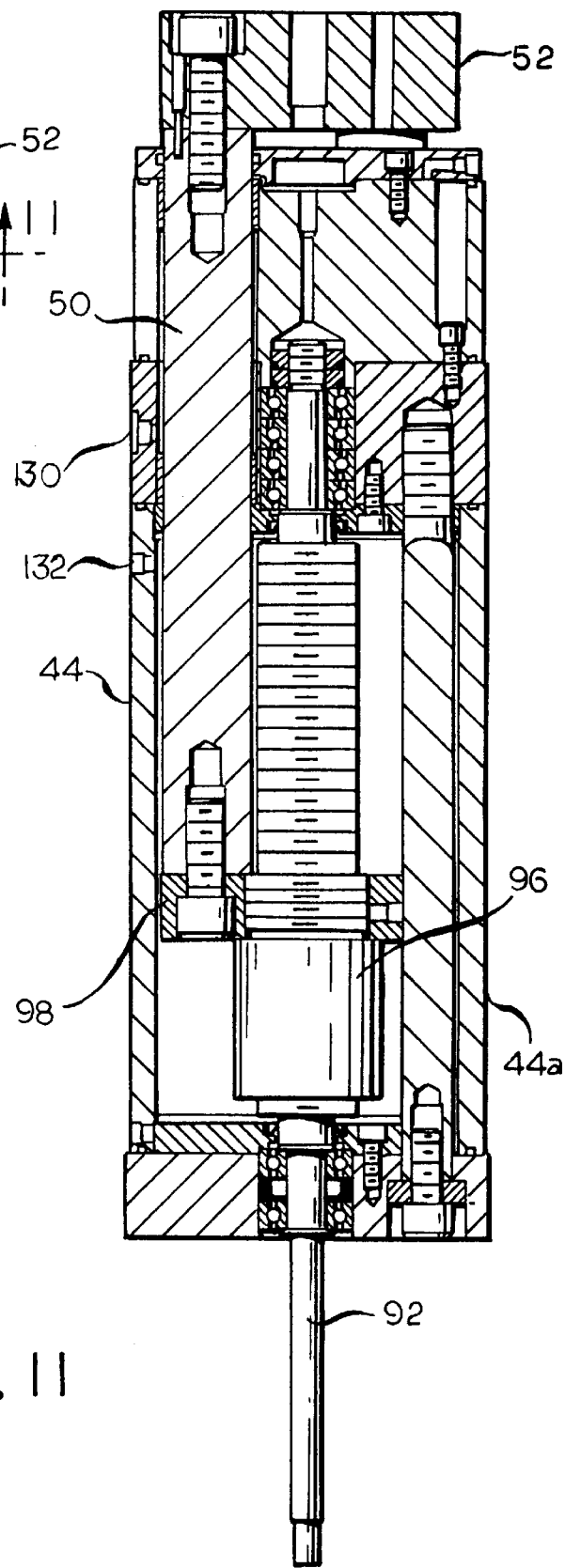
FIG. 11 is a sectional view taken on line 11—11 of FIG. 10.

The linear actuator 44 is powered by an a.c. servo motor 90, which is co-axially connected to the actuator 44, though it is contemplated that the connection can be by way of parallel axes with a V-belt or other drive extending therebetween. In any case, an assembly including the actuator 44 and the servo motor 90 is available from E-Drive Design of Glastonbury, Conn., as heretofore described. As is shown in FIG. 8, the motor 90 has a hollow output shaft 92. The hollow output shaft of the motor 90 is slipped onto an input shaft 94 of the linear actuator 44 (FIGS. 8 and 11), which has an internal ball screw drive 96. The ball screw drive 96 translates rotary motion of the shaft 92 into linear motion of an annular member 98, either to or fro depending on the direction of rotation of the shaft 92.

The annular member 98 may be manually positioned by turning a lever 102, which is fixed to the shaft 92. The shaft 92 extends to a level below the motor 90, actually below the level of an arcuate heat shield 100 that protects the motor 90 from thermal radiation from the feeder bowl B, and the lever 102 extends outwardly from the shaft 92. The lever 102 has a handle 104 projecting downwardly therefrom, at a location radially outwardly of the shaft 92, and the shaft 92 may be turned by manually engaging the handle 104 and using it to turn the lever 102.

Figure 12:
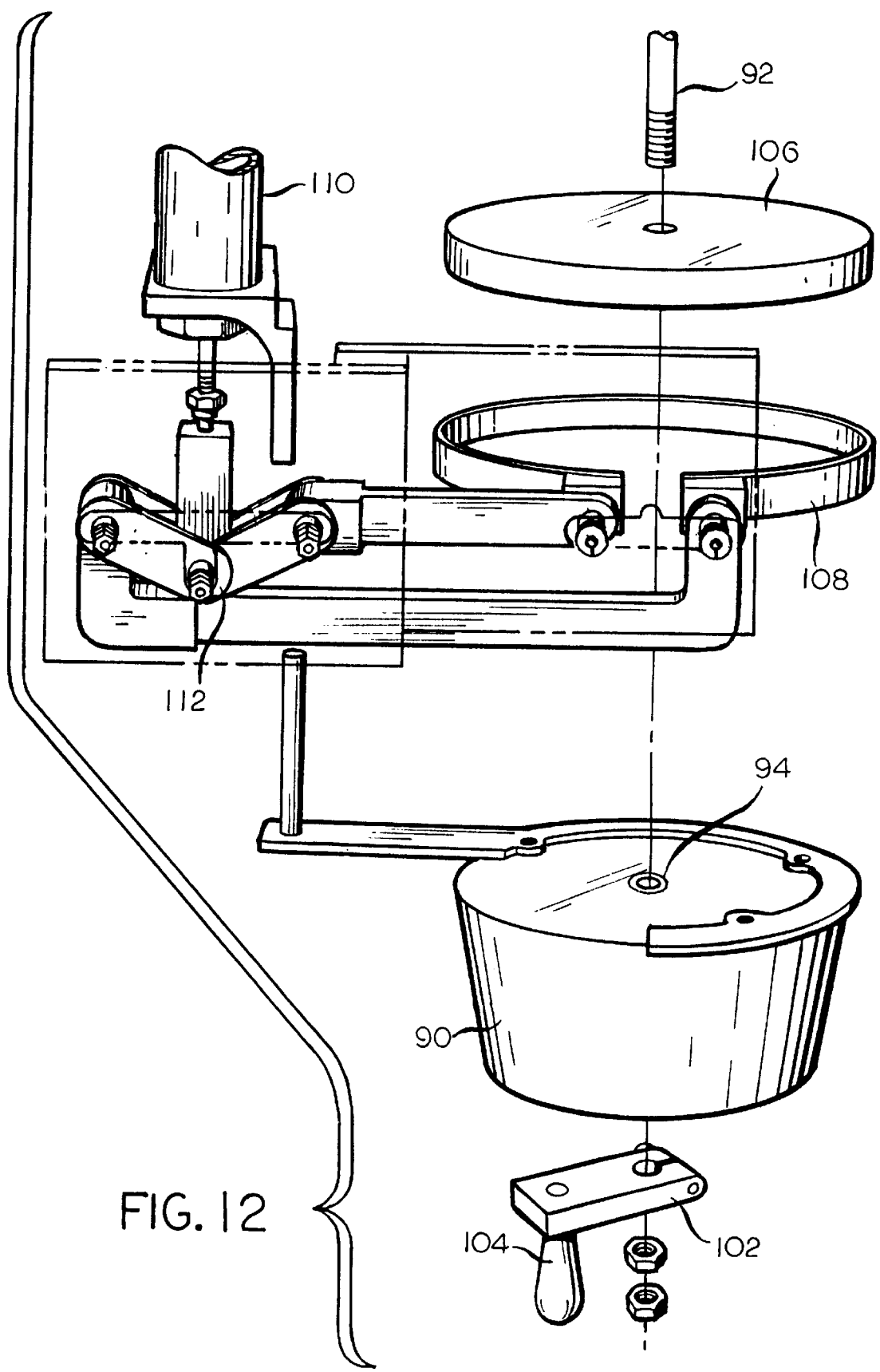
FIG. 12 is an exploded, perspective view of a portion of the apparatus illustrated in FIGS. 8 and 9.

The motor 90 is provided with an annular brake 106 that rotates with the shaft 92, and the brake 106 is selectively engageable by a double-ended constricting band 108. The band 108, when in its non-constricting mode, does not engage the brake 106 and provides no braking effect in such mode. However, the band 108 can be selectively tightened by the actuation of a pneumatic cylinder 110 acting through a linkage system 112, and, when the cylinder 110 is retracted, as shown in FIG. 12, the band 108 will be constricted to engage the brake 106, thus retarding turning action of the shaft 92, 94 and thereby locking the support arm 30 in a desired elevation.

Figure 4:
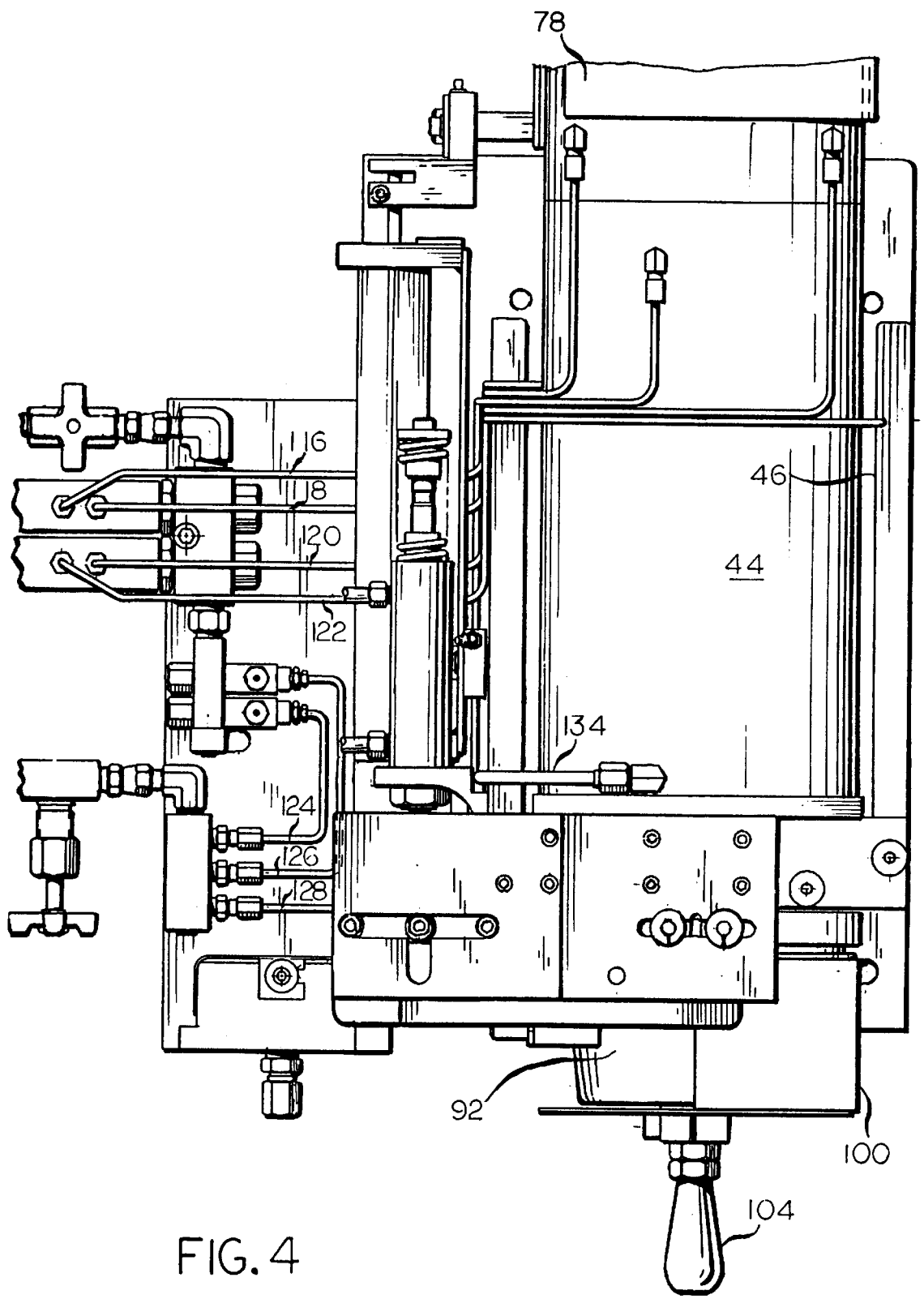
FIG. 4 is a fragmentary view, at an enlarged scale, of a portion of the feeder tube assembly shown in FIG. 1.
Figure 6:
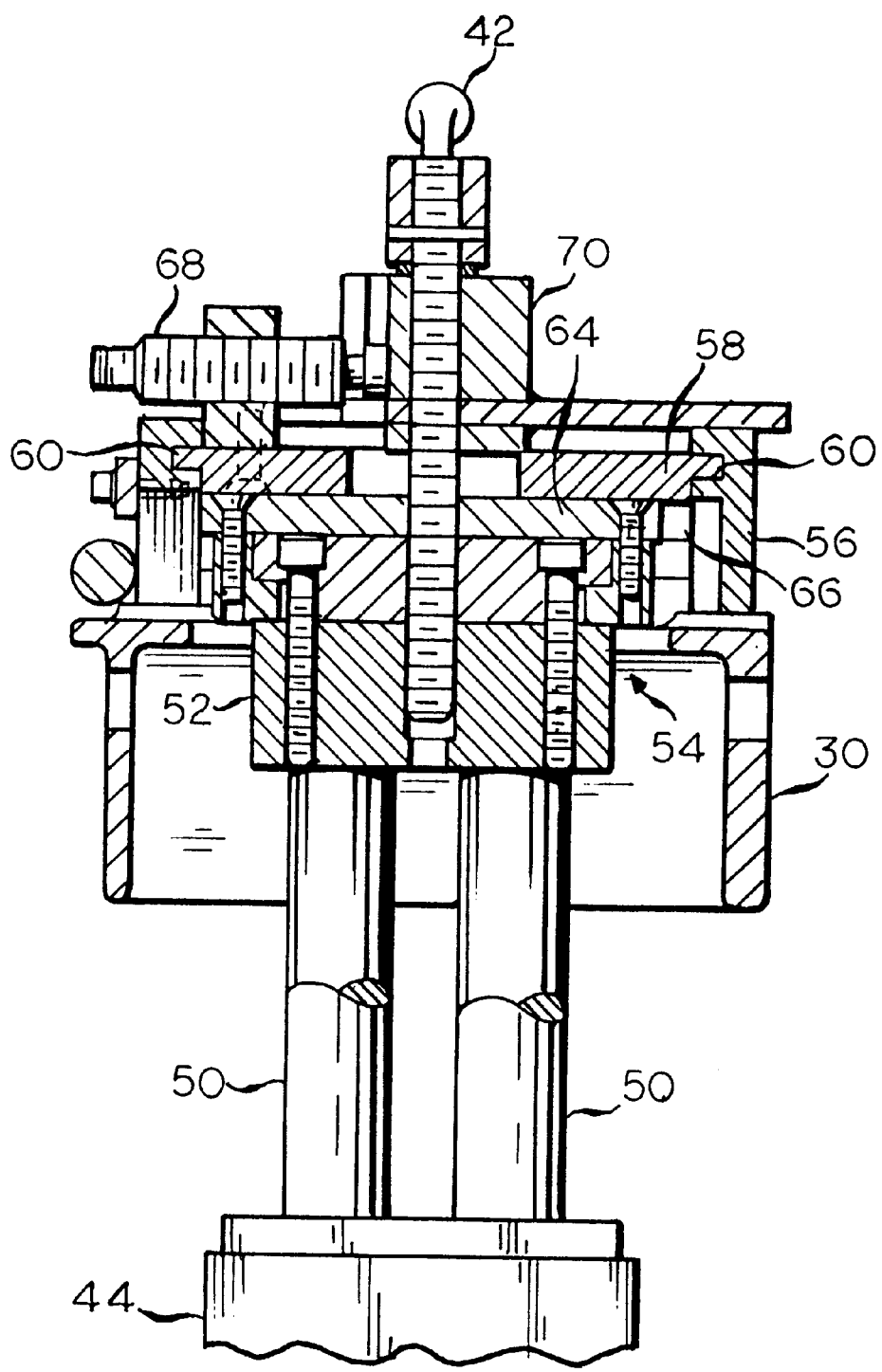
FIG. 6 is a sectional view taken on line 6—6 of FIG. 5.

The linear actuator 44 requires constant lubrication in service, and to that end a plurality of lubricating oil inlet lines 116, 118, 120, 122, 124, 126 and 128 (FIG. 4) to deliver lubricating oil from a common source (not shown) to various locations of the linear actuator 44. These locations include inlets 130, 132 (FIG. 11) of the cylinder 44a of the linear actuator 44 and each of the four (b) rods 50 (FIG. 6) that extend therefrom. The lubricating oil is collected at the bottom of the cylinder 44a and returned to the source for recycling, by way of a return line 134 (FIG. 4) preferably after being filtered and cooled if necessary, with a supply of fresh, make-up oil being provided to make up for any oil losses in the system. The lubricating system, as described, is a closed system that provides adequate lubrication for all moving surfaces while simultaneously minimizing lubricant losses in a hot and relatively inaccessible environment and serving to conserve a product derived from expensive and irreplaceable natural resources.

Figure 13:
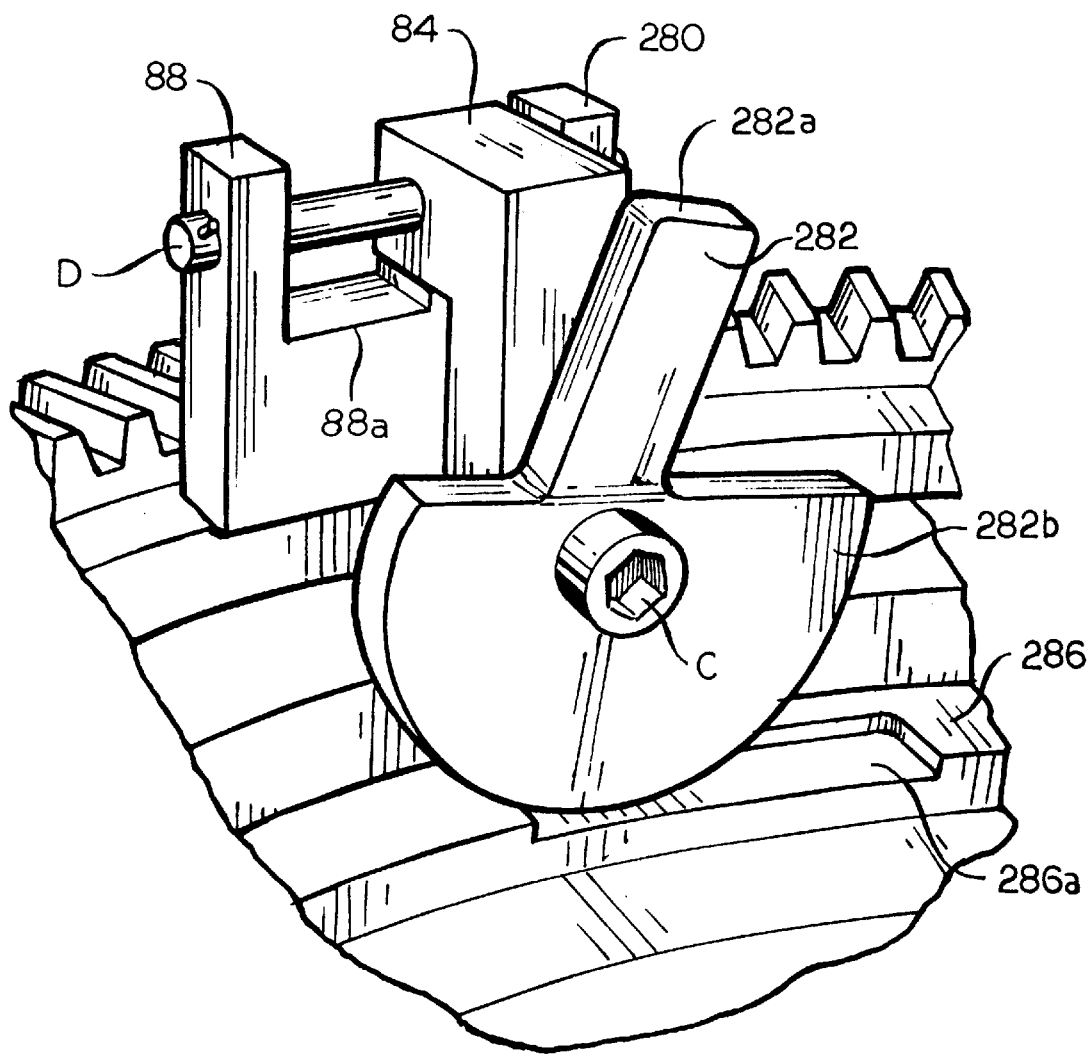
FIG. 13 is a view similar to FIG. 7 illustrating a modified form of the apparatus illustrated therein.
Figure 14:
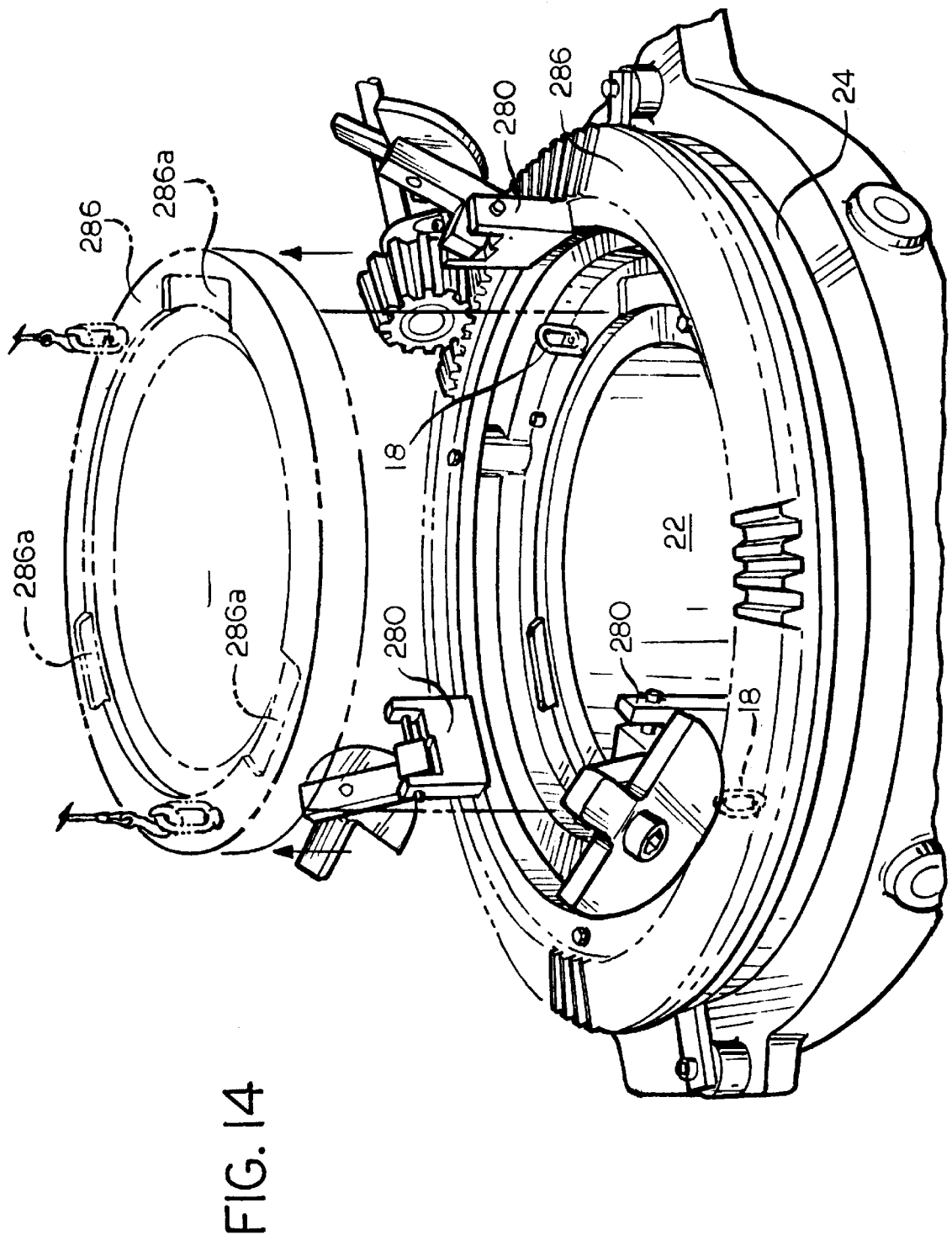
FIG. 14 is a fragmentary perspective view of a feeder tube assembly that incorporates a plurality of the devices of FIG. 13.

In FIGS. 13 and 14 elements that differ from, but correspond in function to, elements of the embodiment of FIG. 1–12 are identified by 200 series reference numerals, the last two digits of which are the two digits of the corresponding element of the embodiment of FIGS. 1–12.

Figure 7:
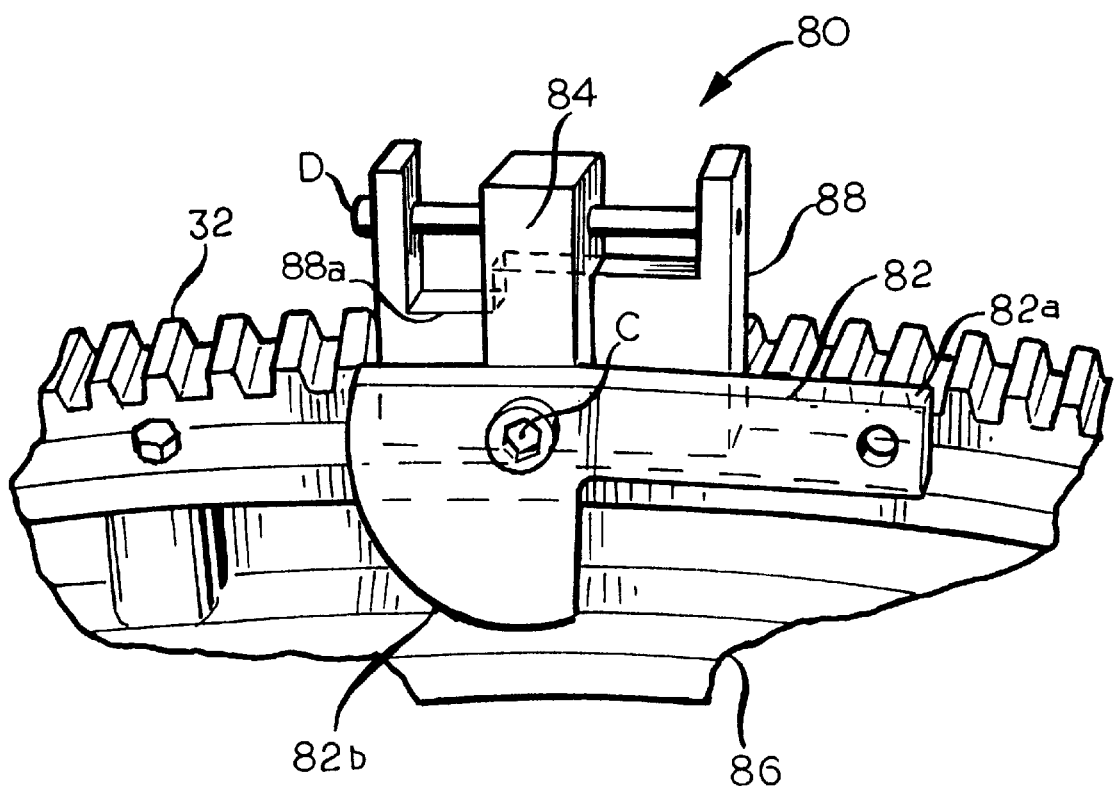
FIG. 7 is a fragmentary perspective view of a portion of the feeder tube assembly of FIGS. 1–6.

FIG. 13 illustrates a latch mechanism 280, and three such latch mechanisms 280 are illustrated in FIG. 14 in circumferentially spaced apart relationship to one another. Each latch mechanism 280 comprises a lever 282 with a handle portion 282a at an end thereof and an enlarged cam portion 282b at an opposed end, the handle portion 282a extending from a position that is between the ends of the cam portion 282b whereas the handle portion 82a of the lever 80 of the embodiment of FIG. 7 is aligned with an end of the cam portion 82b. In that regard, the cam portion 282b of the lever 282 has a profile that is more universally applicable to various installations than is the profile of the cam portion 82b of the lever 82 because of variations in the thickness of the flange portion 24 of the feeder tube 22 from installation to installation. The lever 282 is pivotally connected to a support member 84 about an axis and when the lever 282 extends vertically, the cam portion 282b securely engages a recessed bottom in a notch 286a of a clamping ring 286, which engages the flange 24 of the feeder tube 22 to forcibly press the flange 24 into its desired operating position. The use of the notch 286a in the clamping ring 286 facilitates better engagement of the clamping ring 286 by the cam portion 282b of the lever 282, and it also facilitates easier release of the clamping action of the lever 280 when it is desired to change the feeder tube 22 when the lever 282 is pivoted to a horizontal orientation, the cam portion 282b no longer engages the clamping ring 286. In this position, the clamping ring 286 may be lifted out of position, as is shown in phantom in FIG. 14, to thereupon permit the feeder tube 22 to be lifted out of position, it first being necessary to move each of the latch mechanisms 280 out of interfering alignment with the clamping with the clamping ring 286 and the feeder tube 22. This is done by sliding the support member 84 to the enlarged area 88a of the fixed structure 88 and then by pivoting the support member 84 about the axis D out of interfering relationship with the clamping ring 286.

Although the best mode contemplated by the inventor for carrying out the present invention as of the filing date hereof has been shown and described herein, it will be apparent to those skilled in the art that suitable modifications, variations, and equivalents may be made without departing from the scope of the invention, such scope being limited solely by the terms of the following claims and the legal equivalents thereof

What is claimed is:

1. A latch mechanism for releasably securing a clamping ring to a flange of a feeder tube in a glass melting furnace forehearth installation, said latch mechanism comprising:

a lever having a handle portion and a cam portion with a rounded cam surface, said handle portion extending outwardly from said cam portion away from said rounded cam surface;

a support member, said lever being pivotally connected to said support member at a location near an end of said support member; and a fixed member, said support member being pivotally connected, near an opposed end of said support member, to said fixed member;

pivoting of said support member with respect to said fixed member being effective to swing said lever out of interfering contact with the clamping ring to permit the clamping ring to be lifted out of engagement with the flange of the feeder tube.

2. A latch mechanism according to claim 1 wherein said handle portion extends outwardly from said cam portion at a location at an end of said cam portion.

3. A latch mechanism according to claim 1 wherein said handle portion extends outwardly from said cam portion at a location between ends of said cam portion.

4. In combination with a clamping ring of a type used to engage a flange of a feeder tube in a glass melting furnace forehearth installation, said clamping ring having an upper surface. a latch mechanism for releasably engaging said upper surface of said clamping ring, said latch mechanism comprising:

a lever having a handle portion and a cam portion with a rounded cam surface, said handle portion extending outwardly from said cam portion away from said rounded cam surface;

a support member, said lever being pivotally connected to said support member at a location near an end of said support member; and a fixed member, said support member being pivotally connected to said fixed member, at a location near an opposed end of said support member;

pivoting of said support member with respect to said fixed member being effective to swing said lever out of interfering contact with said clamping ring to permit said clamping ring to be lifted out of engagement with the flange of the feeder tube;

wherein said clamping ring has a notch that is engaged by said rounded cam surface of said lever when said lever is in clamping engagement with said clamping ring.

5. A combination according to claim 4 wherein said handle portion extends outwardly from said cam portion at a location between ends of said camp portion.

* * * * *